Figure 1A:
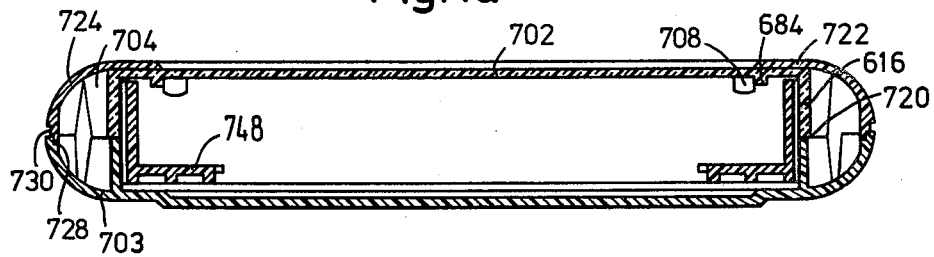

United States Patent [19]

Ackeret

[11] Patent Number: 4,458,434
[45] Date of Patent: Jul. 10, 1984

[54] CONTAINER FOR PICTURES HAVING SIMILAR FORMATS

[75] Inventor: Peter Ackeret, Küsnacht, Switzerland

[73] Assignee: Licinvest AG, Chur, Switzerland

[21] Appl. No.: 285,153

[22] Filed: Jul. 20, 1981

Related U.S. Application Data

[63] Continuation-in-part of Ser. No. 138,641, Apr. 8, 1980, Pat. No. 4,376,348.

[30] Foreign Application Priority Data

Apr. 9, 1979 [DE] Fed. Rep. of Germany ....... 2914351

[51] Int. Cl.$^3$ ............................................ G09F 11/30
[52] U.S. Cl. ....................................... 40/513; 40/490; 40/511
[58] Field of Search .......................... 40/490, 511, 513; 206/519

[56] References Cited

U.S. PATENT DOCUMENTS

| | | | |
|---|---|---|---|
| 1,257,790 | 2/1918 | Bickerton | 40/13 |
| 2,651,129 | 9/1953 | Spertus | 40/156 |
| 2,823,829 | 2/1958 | Frater | 206/519 |
| 3,377,727 | 4/1968 | Weggeland | 40/511 |
| 3,425,147 | 2/1969 | Marx | 40/155 |
| 3,495,345 | 2/1970 | Weggeland | 40/490 |
| 3,783,540 | 1/1974 | Barclay | 40/511 |
| 4,057,920 | 11/1977 | Weggeland | 40/513 |
| 4,238,898 | 12/1980 | Ackeret | 40/511 |
| 4,238,899 | 12/1980 | Ackeret | 40/511 |
| 4,241,528 | 12/1980 | Ackeret | 40/513 |
| 4,241,529 | 12/1980 | Baur | 40/490 |
| 4,242,820 | 1/1981 | Ackeret | 40/513 |
| 4,245,417 | 1/1981 | Ackeret | 40/513 |
| 4,259,802 | 1/1981 | Ackeret | 40/513 |

Primary Examiner—Gene Mancene
Assistant Examiner—David L. Tarnoff
Attorney, Agent, or Firm—Peterson, Palmatier, Sturm, Sjoquist & Baker, Ltd.

[57] ABSTRACT

Container for pictures, especially for photopositives, which is constructed to be at the same time a stand-up or hanging frame or a component of an archive. The container has centering elements by means of which the uppermost picture of a stored pile is completely visible in the viewing window.

16 Claims, 25 Drawing Figures

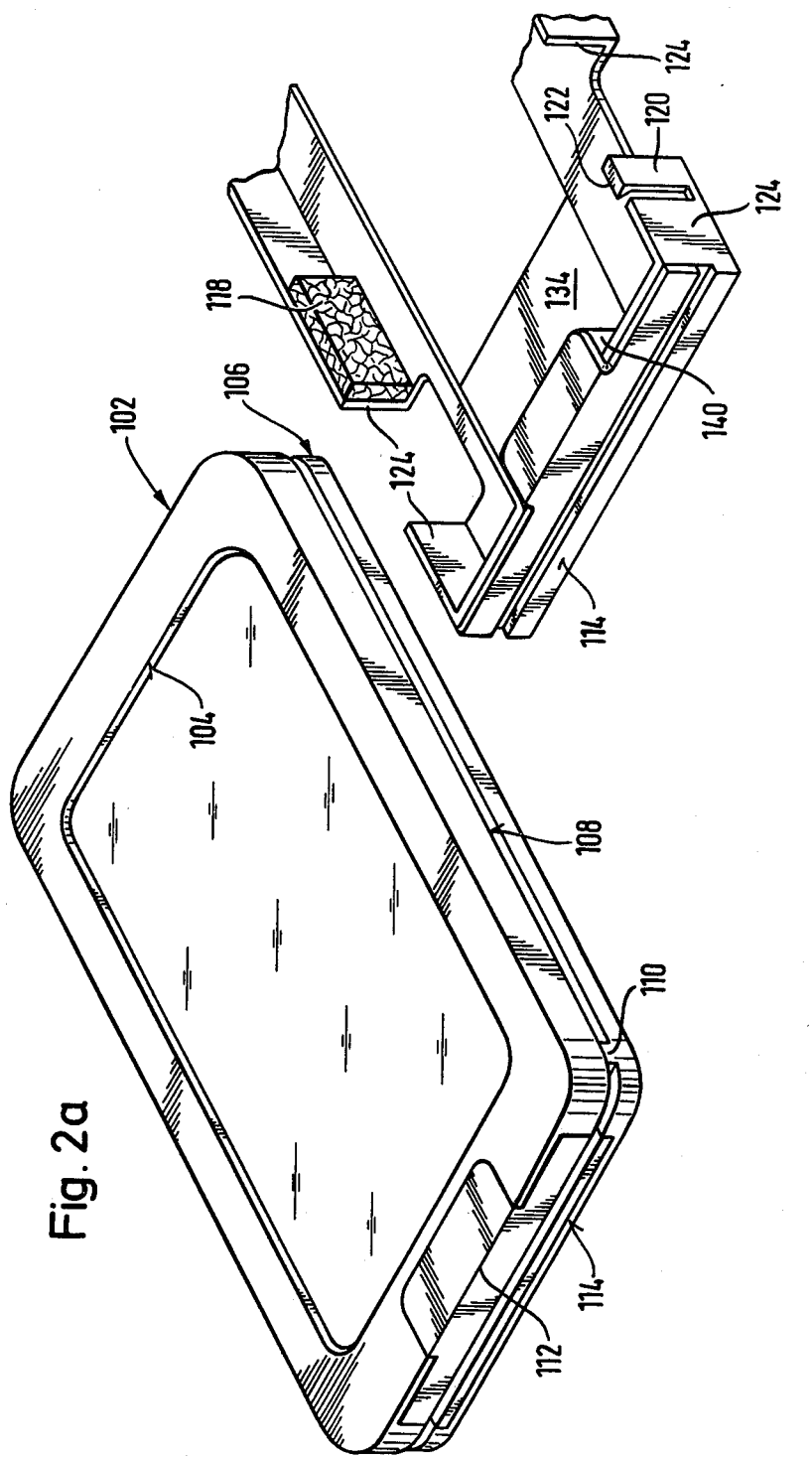

Fig. 4b
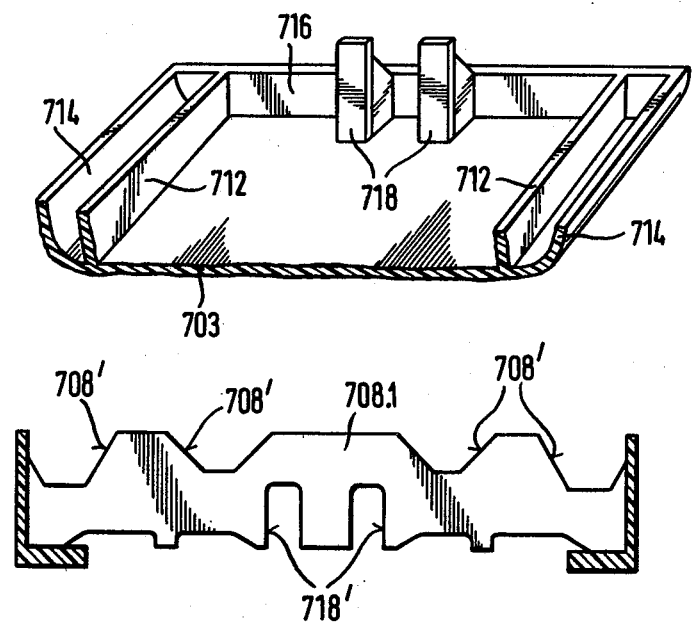
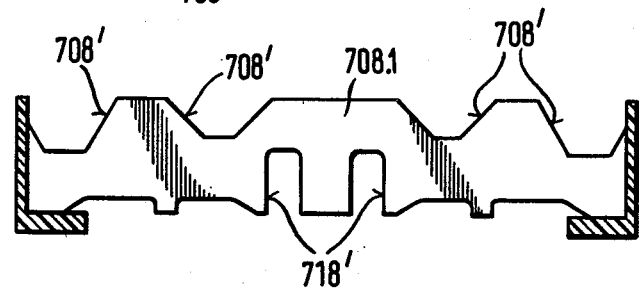
Fig. 4c

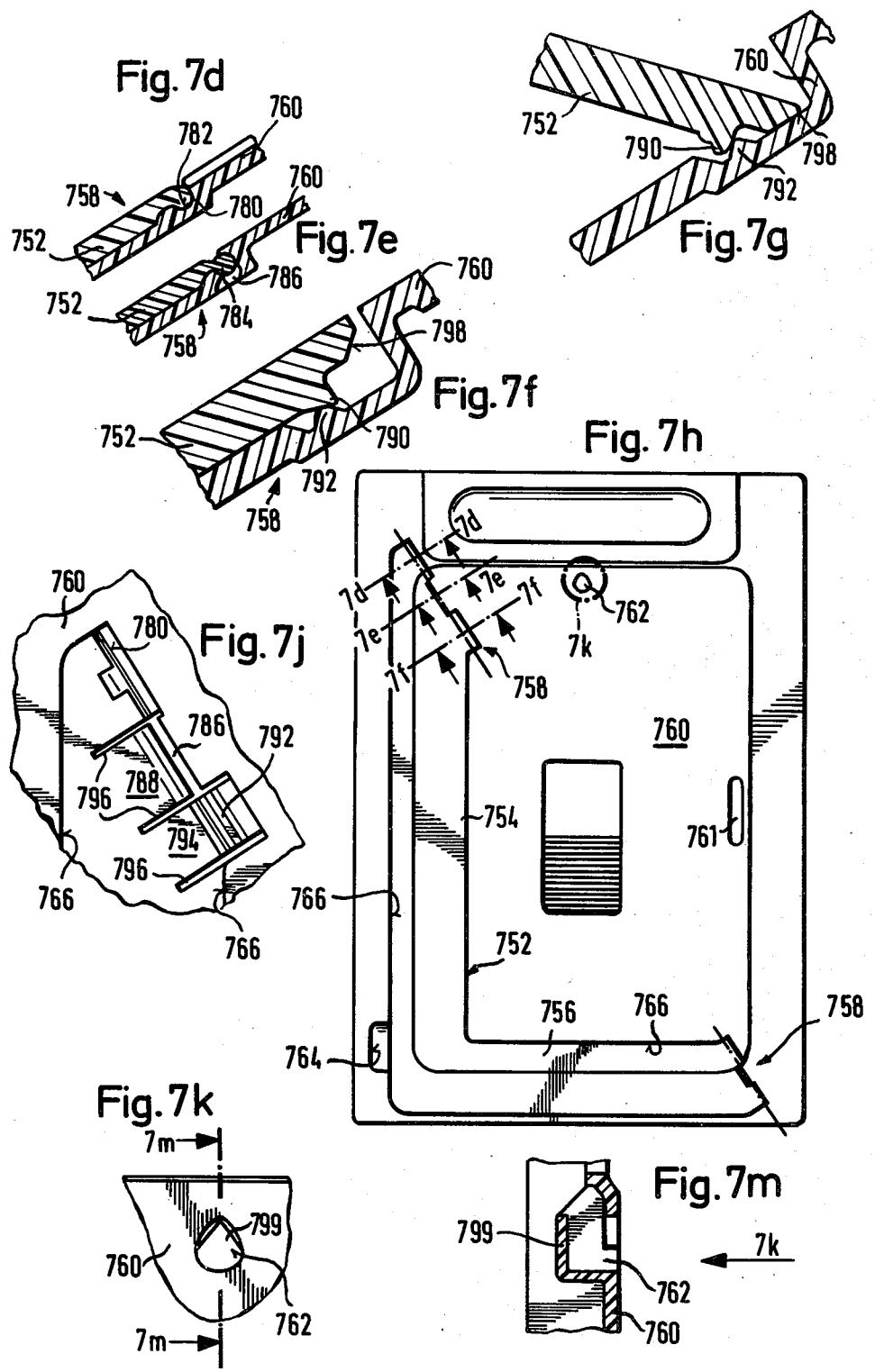

CONTAINER FOR PICTURES HAVING SIMILAR FORMATS

This application is a continuation-in-part of Ser. No. 138,641 filed Apr. 8, 1980, now U.S. Pat. No. 4,376,348, issued Mar. 15, 1983.

The invention relates to a container for pictures having similar formats. A container for pictures, that is to say for photopositives, is described and illustrated by the features mentioned in the precharacterising clause of patent claim 1 in DE-OS 27 42 347.

The containers illustrated and described in the above-mentioned specification have external dimensions that are slightly larger than the picture format itself; that is to say, when the uppermost picture of the pile lies under the viewing plate, its edges that rest against the internal faces of the container walls lie parallel to the edges of the viewing window and the picture lies "correctly" for the viewer. If the viewing window extends over the whole surface of the container, nothing is cut off even at the edges of the picture.

No objection may be made to the known container from the operational standpoint, but fault can be found with the aesthetic aspect. If, for example, the container is to be used not only for housing photographs, but, alternatively, also as a picture frame, either as a hanging frame or as a stand-up frame, the container differs unfavourably from the conventional design of such frames. In order to be capable of housing a suitable number of photographs, for example twenty four, the container is necessarily too thick in relation to its outline, and it lacks the very feature that constitutes a picture frame, that is to say, the framing areas of approximately equal width around the viewing window.

In a container of the type mentioned at the beginning that is currently on the market, attempts have been made to alleviate the last-mentioned disadvantages by constructing the viewing window to be smaller than the photograph format. This has the considerably disadvantage, however, that all the picture information, which, as is known, in photopositives frequently extends over the whole surface of the paper, is no longer presented through the viewing window.

The problem underlying the invention is to construct a picture container with two parts movable with respect to each other such the container is aesthetically satisfactory, while the entire content of the picture presented at the viewing plate is visible, and without the need to expend considerable cost for its manufacture, which would render it unattractive as a housing container.

Accordingly, the external dimensions of the container are increased in the plane of the picture by the widths of the framing areas, with the result that the surface to thickness ratio is aesthetically improved and the function as a picture frame can better be fulfilled. This measure alone is not sufficient, however; the pile or, at least, the uppermost picture must be in alignment with the viewing window and must be held permanently in this position. The edge stops serve for this purpose.

It can be seen that a container of this type can be manufactured with a relatively small amount of material and effort, especially when it is so constructed that it comprises two injection-moulded parts of plastics material that can be moved relative to one another.

Preferably, one part of the container is constructed in the form of a housing having the viewing window, into which the other part of the container, in the form of a slider member, is pushed parallel to the viewing window. Housing and slider member then have, as mentioned above, larger dimensions than would actually be necessary for the particular picture format; the pictures are nevertheless positioned very accurately underneath the viewing window by means of the centering elements, preferably stops. The enlargement of the housing contour makes it possible to use the boundary between the viewing window and the portions of the surface of the housing that surround it as a positively locking element which allows several similar containers to be stacked one above the other, without the front face of the container being disfigured by details that have a "technical appearance", which is important for its function as a picture frame. A very attractive solution consists in setting back the window face towards the inside and constructing a corresponding bulging portion on the underside of the housing so that the individual, similar containers can be arranged one above the other like a pile of plates. This, on the other hand, makes it possible to provide the end faces of the slider members lying one above the other in the pile with labels which again would be of importance for the housing and archiving functions.

Other features that develop the invention are defined in the subsidiary claims. Preferred embodiments are shown in the drawings and are explained in detail in the following; in all the embodiments the parts of the container are constructed, on the one side, in the form of a housing having a viewing window and, on the other side, in the form of a slider member.

Figure 1B:
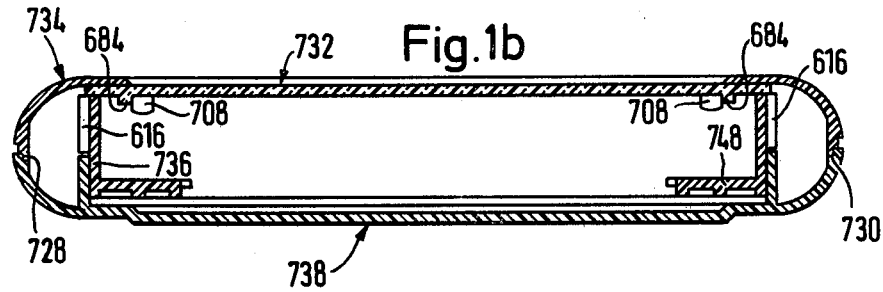
Figure 1C:
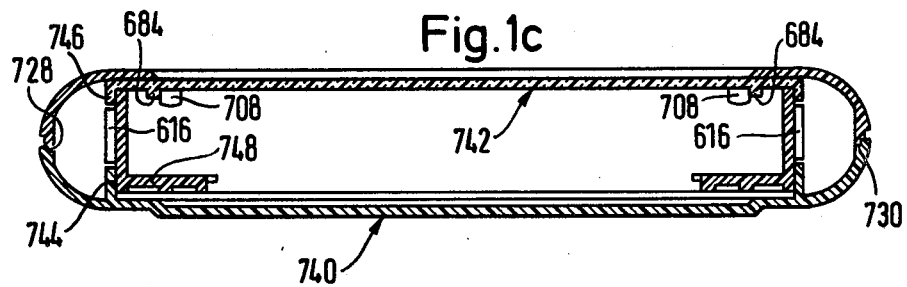
Figure 1D:
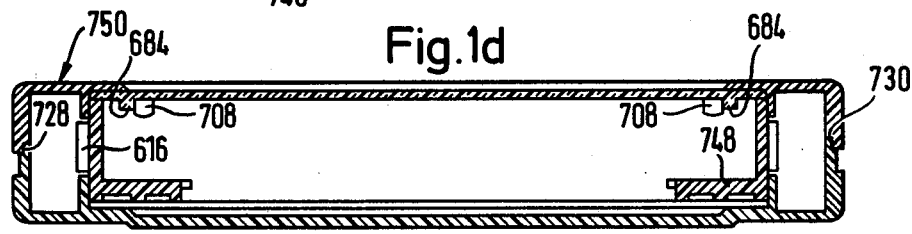
Figure 3:
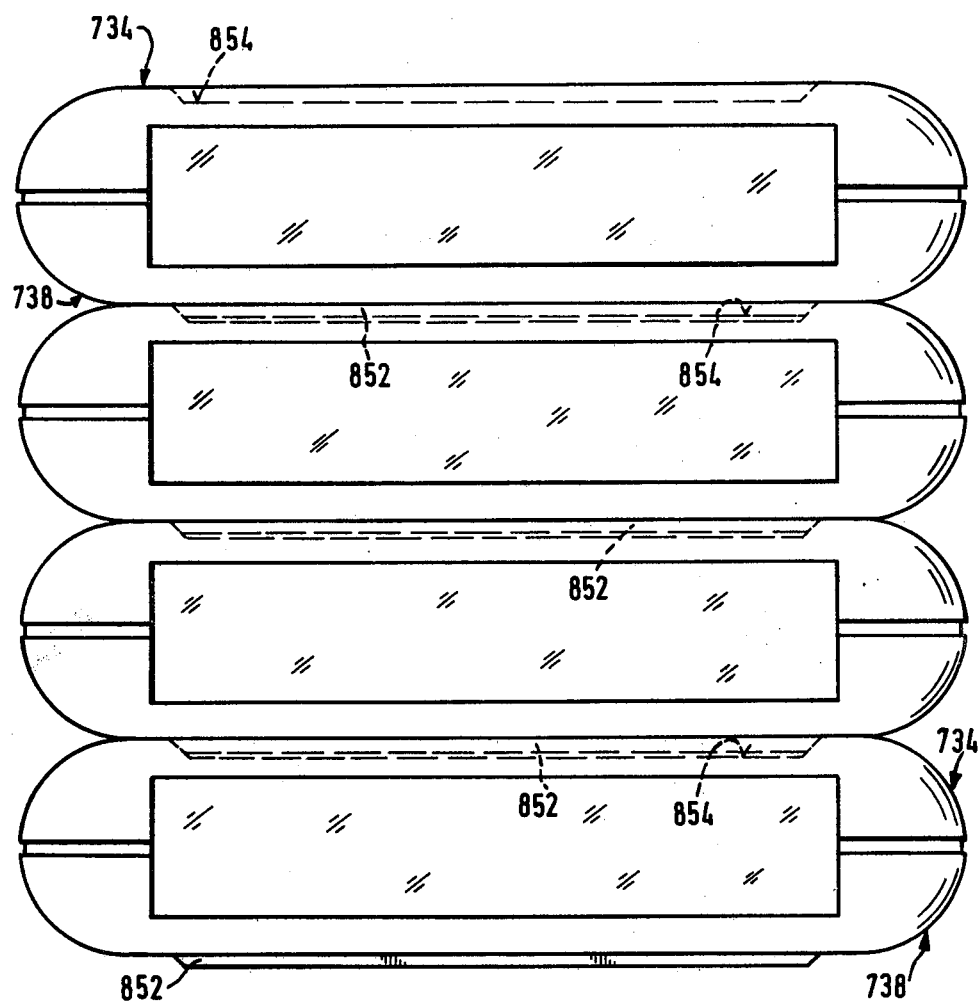
Figure 4A:
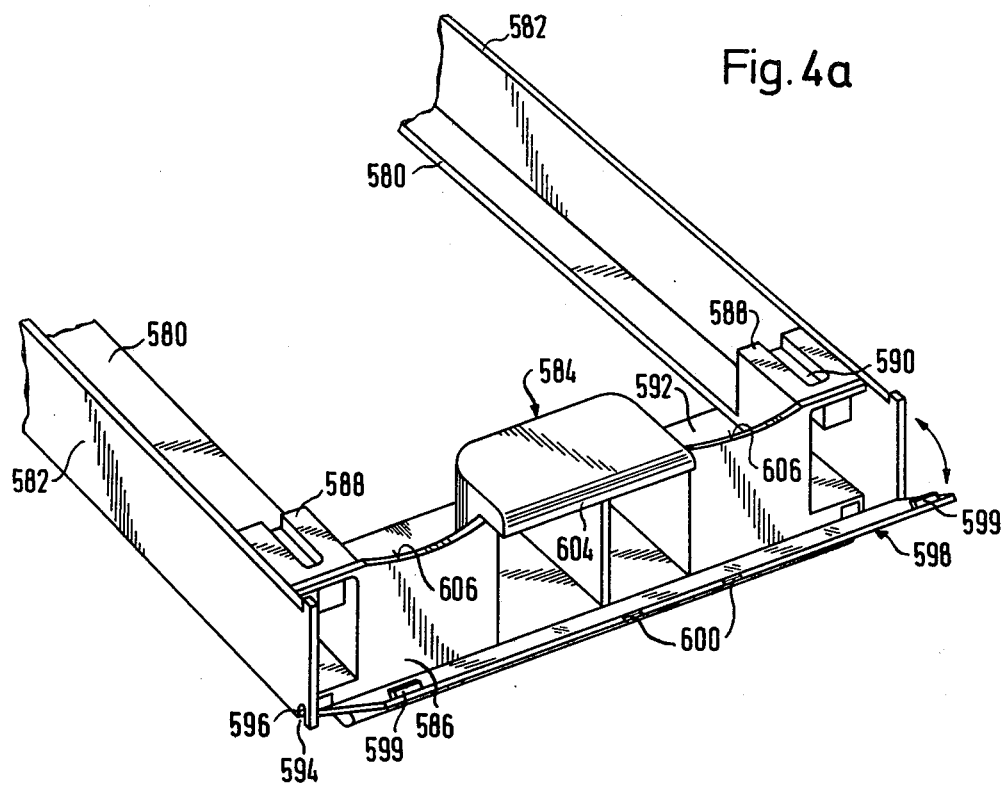
Figure 5:
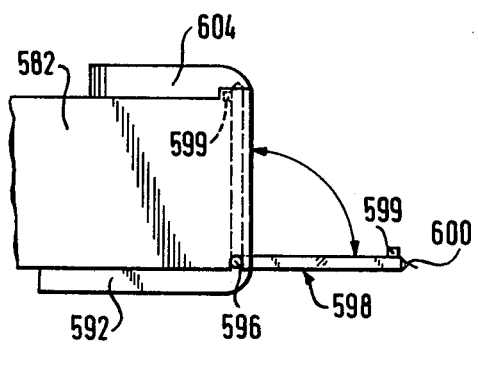
Figure 6:
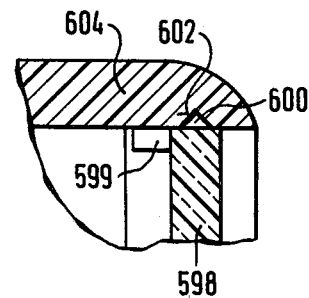

FIGS. 1a–1d, are cross-sections through the case and slider member of four embodiments of the invention, the sections being taken perpendicularly to the direction of withdrawal of the slider member, FIG. 2a shows, as an example, a perspective view of the container according to FIG. 1d, seen obliquely from above, FIG. 2b shows the forward portion of the associated slider member, FIG. 3 shows a schematic view, in elevation, of the end faces of a pile of containers according to FIG. 1a, FIG. 4a shows a partial perspective view of the grip end of the slider member in the embodiment according to FIG. 1a, FIG. 4b shows a perspective view of that end of the lower shell of the housing remote from the housing opening, FIG. 4c shows, in elevation, the associated rear face strip of the slider member, FIG. 5 shows a partial side view of the slider member according to FIG. 4, FIG. 6 shows, on a larger scale than FIG. 5, a partial sectional view of a detail of the label mounting, and FIGS. 7a to 7m illustrate the construction of the container according to FIGS. 1a and 3–6 on its rear face, especially the construction and arrangement of a stand-up foot.

As can be seen in FIGS. 1a–1d, for reasons of production engineering the housing preferably comprises an upper shell and a lower shell, a spring pressure arrangement being mounted in the lower shell. This is not shown in the Figures in the drawings because it does not require a special construction within the scope of the present invention and can be taken from the state of the art.

In the embodiment according to FIG. 1a the container comprises a viewing window component 702, which is inserted into the upper shell 724 and is welded or glued to this (the components consist of plastics material that can be injection-moulded, preferably polystyrene). Positioning lugs 704, between which the viewing window component 702 fits, are shaped onto the upper shell 724, and a framing or peripheral portion 722 engages over the flat upper face of the viewing window component 702. This face is accordingly set back with respect to the surface of this peripheral portion 722 which also serves to conceal the stops 684, 708 serving for the alignment of the pictures (these stops are shaped onto the upper shell and can be seen in plan view in FIG. 1a); it is also possible to see, however, that there is only a small peripheral region of the picture that cannot be seen through the viewing window.

The viewing window 702 has edge portions 616 which project in the direction towards the lower shell but which could also be shaped onto the upper shell; in the latter case the viewing window component would basically be a flat plate of transparent plastics material.

The lower shell 703 has an edge contour that is constructed to be approximately a mirror-image of the rounded-off edge region of the upper shell. Similarly as has been given above as a possible alternative for the upper shell, the lower shell is of double-walled construction in this edge region, the free edges of the external wall fitting, in a positively locking manner, into a correspondingly complementarily constructed cross-sectional shape 730 on the edge of the upper shell at point 728. Like the upper shell, the lower shell has lugs similar to the positioning lugs 704, which help to stiffen the whole housing and which also correctly distance the components before they are glued or, preferably, ultrasonically welded together. Since this connection can be made also at the place of abutment 720 between the periphery 616 of the viewing window component and the internal wall of the lower shell, the three components 702, 724, 703 are then durably connected to one another. The slider member 748 is inserted previously because this has stops (not shown in FIG. 1) to prevent it being removed completely.

Somewhat different from this is the embodiment according to FIG. 1b. Here, the upper shell 732 is merely a plate which is first of all welded to the cover frame 734. The stops for the withdrawal of the slider member are each arranged on the side struts 736 of the slider member and co-operate with counterstops on the lower shell 738 of the housing which are not visible in the sectional view. The lateral supporting limbs of the frame construction are not shown in this Figure and in FIGS. 1c and 1d; they correspond approximately to the embodiment according to FIG. 1a.

In FIG. 1c narrow lateral rails 744 and 746 project towards one another from the lower shell 740 and the upper shell 742 respectively, between which rails the stops shaped on the slider member 748 run. The counterstops are then provided both on the upper shell and on the lower shell.

FIG. 2a shows, as an example, a perspective view of a container as it is shown similarly in FIG. 1d. It is possible to see clearly the raised edge 104, by the thickness of which the viewing window is set back with respect to the framing portion of the upper shell, and an almost completely encircling groove 108 between the lower shell 106 and the upper shell 102 which here, for aesthetic reasons, is provided also on the end face of the slider member 114. This embodiment has no label window, as will be explained later. It is, however, possible to see the slide grip 112, which fits very exactly into the outline of the upper shell, so that only a very small gap is produced which is barely perceptible and aesthetically unobtrusive.

In FIG. 2b it is possible to see the end-face end of the slider member 114 having side ledges 124, a base reinforcement member 134 and an inwardly projecting grip part 140, which here, as a stop, abuts the edges of an inserted pile of pictures, that is to say, photographic prints (not shown). The ledges 124 themselves can form the lateral edge stops or alternatively these can be formed by an inserted foamed-plastics platelet 118. A resilient lug 120 having a claw 122 prevents the photographic prints immediately being ejected when the slider member is pulled out—as may happen if the prints have curved under the pressure of a pressure spring. The third stop for the edge of the photographic print opposite the grip part can likewise be arranged on the slider member but it is preferably shaped on the housing, as will be explained later. On comparing FIG. 2a with FIG. 2b it can be seen that the edges of the inserted photographic prints will lie almost flush with the boundary edge of the viewing window in the housing, in any case with regard to the stops described so far, and the same applies also to the fourth stop. The very narrow overlapping portion that remains corresponds to the tolerance when cutting the photographic prints: the size of the viewing window is tailored to the minimum tolerance limit and the distances of the edge stops are adapted to the maximum tolerance limit.

FIG. 3 shows a schematic front view of several containers, for example according to FIG. 1b, arranged one above the other and it can be seen that the projecting base portion or the bulging portion 852 fits exactly into the internal contour 854 of the portion of the surface surrounding the viewing window in the container lying directly below. Although it can be seen from FIGS. 1a-1d that the bulging portion of the housing base has the same wall thickness as the rest of the lower shell, which can be preferred for reasons of production engineering, this gradation can also be produced by increasing the thickness of the wall, which is advantageous when, for example, a stand-up foot (not yet described) is provided.

It can also be seen in FIG. 3 that a wedge shape is provided for the cross-sections of the interlocking contours of the containers. The upper container therefore does not rest by its outer region on the viewing window of the lower container (risk of scratching!) but by the region of the step on its base, so that variations caused by manufacturing tolerances can be taken up.

In FIG. 3 it is also possible to see the position and the dimensions of a label window that is provided on the slider member of the container and will now be described with reference to FIGS. 4–6.

FIGS. 4 to 6 show in detail the construction of the slider member close to its grip end; a slider of this type or of similar type can be provided in a container according to FIG. 1.

Slider member ledges 580 with injection-moulded lateral guides 582 and the grip 584 in the centre of the front wall 586 can be seen. The transverse edges of the pictures resting on the ledges 580 can be supported against grip 584 and lateral stops 588. Grip 584 and stops 588 are hollow. The stops 588 have on their upper side a depression 590 in which holding down cams on the housing are located. On the underside of the slider member the ledges are connected to one another by a base cross-member 592. The base cross-member fits into a complementary cut-out portion in the housing which does not extend over the entire width of the housing. For this reason, between the lateral guides 582 and the base cross-member 592 there remains a corresponding space and the lateral guides are in this region accessible at their lower edges. Close to their ends, these lower edges each have an elongate incision 594, into which a hinge-pin 596 of a label cover 598 is rotatable. When assembling the label cover, this is resiliently deformed and snapped into the incisions 594. Between the front wall 586 and the label cover, which is made of transparent plastics material, a label (not shown) can be inserted; thereafter, the cover 598 is hinged up out of the insertion position shown in FIG. 4a and is locked with shaped-on teeth 600 in a slot 602 on the underside of the top wall 604 of the grip. The outer face of the cover 598 then closes flush, as can be seen in the vertical section FIG. 5. FIG. 6 shows, on an enlarged scale, the locking mechanism of the label cover. The cover may be released when the slider member has been pulled out by pressing with the fingers in the region of two inwardly-projecting curvatures 606 in the front wall.

FIG. 4b shows a perspective, partly broken away view of the associated lower shell of the housing in a double-walled construction. The inner struts 712 are congruent with the side walls of the upper shell and along the contact faces the two shells are welded together ultrasonically.

From the housing wall 716 two picture edge stops 718 project inwards. They have to clear the path of the slider member and especially the path for the carrier comb 708.1 forming the rear wall of the slider member, shown in front view in FIG. 4c. For this reason the comb 708 has cut-out portions 718', 708', the latter clearing the way also for stops located on the upper shell.

It is advisable, of course, when using the container as a stand-up frame to arrange the particular edge provided with the label at the bottom; this results also in the preferred attachment of the stand-up foot according to FIGS. 7a–m.

Figures 7A, 7B, 7C:
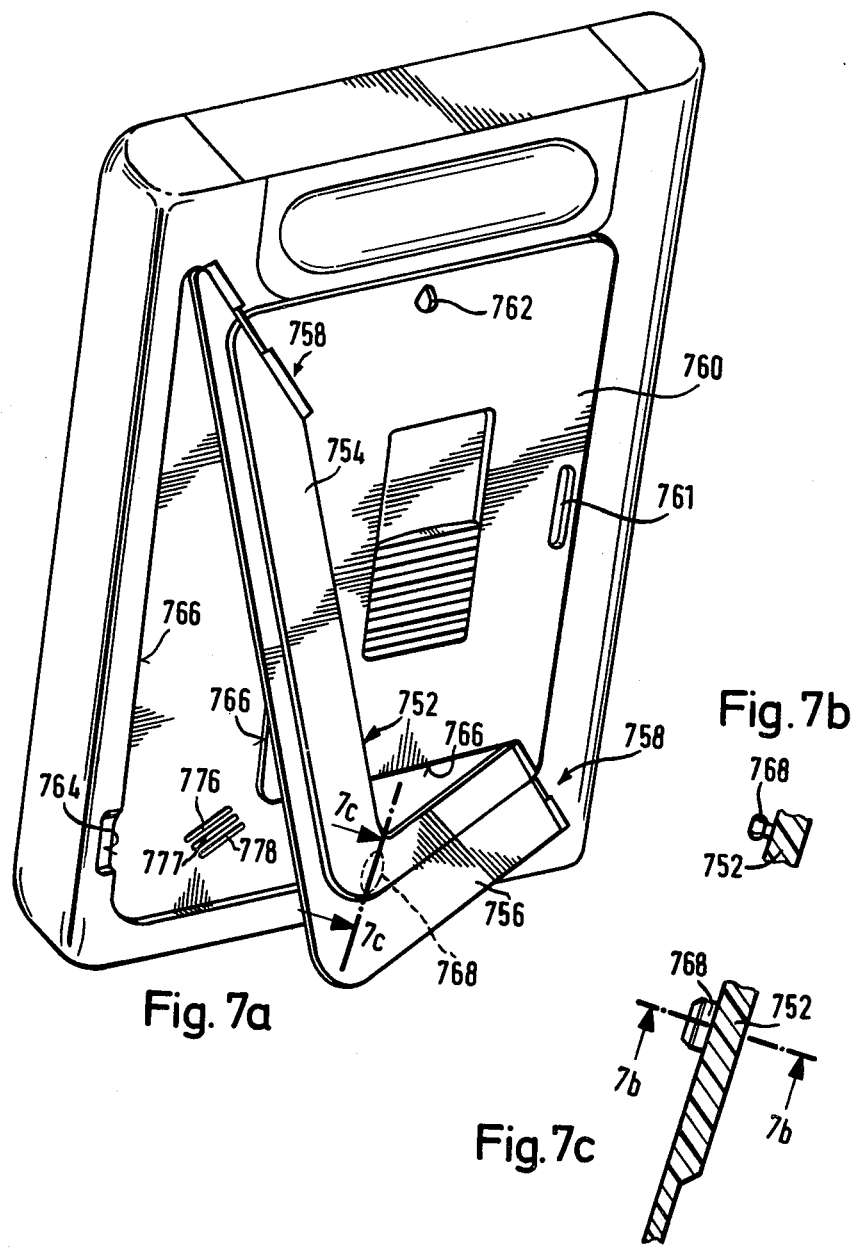

FIGS. 7a to 7m show the arrangement and construction of a stand-up foot in a container for example according to FIG. 2a. In FIG. 7a the container can be seen from the rear with the stand-up foot 752 opened out. The stand-up foot has a longitudinal limb 754 and a transverse limb 756 and is connected by means of hinges 758 to the lower shell 760 of the housing in such a manner that, when opened out, it permits the device to be set up like a table-top stand both in upright format and sideways format, but when folded in, lies flush with the external face of the lower shell, so that the container may optionally also be used as a hanging frame. For that purpose, eyelets 761, 762 are provided.

On the lower shell 760 of the housing there is provided a depression 766 accommodating the foot 752; furthermore, there can be seen a finger incision 764 for the movement of the foot and three slot-shaped openings 776, 777 and 778. In the slot 777 there locks an elongated stud shaped on the foot 752, the strips defining the slot 777 then being able to move resiliently into the slots 776 and 778 respectively. The stud 768 is illustrated in FIGS. 7b and c.

FIGS. 7d–j shows in detail the construction of the hinges 758. Description of only the one hinge will be sufficient, the other being mirror symmetrically constructed. In FIG. 7h, which shows a plan view onto the rear side (lower shell) of the container, in each case those sections are marked which are illustrated on a greatly enlarged scale in FIGS. 7d–f, namely with the foot 752 folded in. FIG. 7g is a section corresponding to FIG. 7f but with the foot opened out. Viewed in the axial direction of the hinge, three portions can be distinguished: the stop portion as shown in FIG. 7d, in which a roll-off edge 780 on the foot engages in a complementary roll-off groove 782 of the lower shell; a holding portion as shown in FIG. 7e, in which a hinged portion 784 of the foot is snapped into a hinge aperture 786 in the base of the lower shell, (a lug 788 of this base is laterally limited by slots so that it is able to yield resiliently outwards cf. FIG. 7j); and a locking portion as shown in FIGS. 7f, g, wherein a projection 790 shaped on the foot 752 snaps resiliently over a rib 792 when the foot is opened out or folded in. In that operation, a second lug 794, likewise limited by slots 796, yields inwards. The opening out angle of the foot is defined by its stop edge 798 (FIG. 7g).

FIG. 7k shows, again on an enlarged scale, the eyelet 762 past which the slider member has to slide. For that reason a wall hook, on which the frame hangs, must not project too far into the housing so that the eyelet opening in the interior of the housing is closed off by a transverse wall 799 (FIG. 7m).

I claim:

1. Container having a substantially rectangular outline for the accommodation of a pile of pictures of similar formats, consisting essentially of two parts which can be moved relative to one another and which, when in an open position, permit the pile to be removed, one of the parts comprising a housing having an upper and lower shell united together and having a transparent viewing window with edges in the upper shell, the other of the parts comprising a slider member which is slidable into the housing in a direction parallel with the viewing window, the parts in a closed position of the container, having a format similar to that of the piled pictures the uppermost of which is presented at the viewing window, the container having outer edges defining the outer perimeter of the container in closed condition, all viewing window edges being at substantially equal distances from the outer edges of the container so that the viewing window is framed substantially equally at all edges thereof by border surface portions of the container, the container having picture engaging centering elements therein at locations spaced substantially equally inwardly from all perimeter edges of the container in closed condition and by means of which, when the container is closed, at least all the edges of the uppermost picture are aligned with respect to the viewing window edges, said viewing window having dimensions substantially equal to those of said pictures, and said centering elements being disposed substantially perpendicular to said viewing window plane and coincident with the outline thereof for maintaining the entire uppermost picture within the viewing window.

2. Container according to claim 1, wherein the centering elements are stops assigned to the edges of at least the picture presented at the viewing window.

3. Container according to claim 2, wherein some of the stops are constructed on one part of the container and the remaining stops are constructed on the other part of the container.

4. Container according to claim 1, 2 or 3, and the slider member having a grip part to be manually grasped for moving the slider member, one of the stops being on the grip part.

5. Container according to claim 1, 2 or 3, and a pile pressure spring arrangement is provided opposite the viewing window in the housing.

6. Container according to claim 1, 2 or 3 wherein the housing has a front surface surrounding and generally parallel to the window in the manner of a frame, the viewing window being set back towards the inside with respect to the portions of the front surface of the housing, and the underside of the housing remote from the viewing window having a bulging portion that is substantially congruent with the viewing window.

7. Container according to claim 6, wherein the bulging portion is constructed to fit, in a positively locking manner, onto the viewing window of a similar container.

8. Container according to claim 1, 2 or 3, wherein the slider member has an end face that, in the inserted position of the slider member, lies substantially flush with the contour of the housing.

9. Container according to claim 4 wherein the grip part of the slider member conforms to the contour of the housing.

10. Container according to claim 8, and the slider member having a label window adjacent its end face.

11. Container according to claim 10, wherein the label window includes a transparent cover that can be hinged upwards.

12. Container according to claim 6, and a part of the bulging portion is formed by a stand-up foot which can be hinged out from the underside of the housing.

13. Container according to claim 4, wherein the housing has a rear end remote from the grip part of the slider member, certain of said stops being on the rear end of the housing and adjacent the edge of the viewing window.

14. Container according to claim 13, wherein the slider member has a picture engaging carrier element constructed in the manner of a comb having teeth perpendicular to the edges of the picture there being, gaps between the teeth for passing by the stops on the rear end of the housing.

15. Container according to claim 14, wherein the carrier element of the slider member forms a transverse wall, opposite the grip part, of the slider member, and the slider member having lateral guide strips connecting the grip part to the transverse wall.

16. Container according to claim 15, wherein the housing has slider member guide strips and is of double-walled construction in the region of the slider member guide strips.

* * * * *